US012772963B2

(12) United States Patent
Wyckoff

(10) Patent No.: US 12,772,963 B2
(45) Date of Patent: Oct. 27, 2026

(54) PRODUCTION SYSTEM, PROGRAM, CONTROL METHOD, AND PRODUCTION METHOD

(71) Applicants: Plantform Inc., Nagaoka (JP); METAWATER Co., Ltd., Tokyo (JP)

(72) Inventor: Naoe Wyckoff, Nagaoka (JP)

(73) Assignees: METAWATER Co., Ltd., Tokyo (JP); Plantform Inc., Niigata (JP)

(*) Notice: Subject to any disclaimer, the term of this patent is extended or adjusted under 35 U.S.C. 154(b) by 38 days.

(21) Appl. No.: 18/056,953

(22) Filed: Nov. 18, 2022

(65) Prior Publication Data

US 2023/0080040 A1 Mar. 16, 2023

Related U.S. Application Data

(63) Continuation of application No. PCT/JP2021/019262, filed on May 20, 2021.

(30) Foreign Application Priority Data

May 21, 2020 (JP) ................................ 2020-089171

(51) Int. Cl.

*A01K 63/00* (2017.01)
*A01G 31/02* (2006.01)
*A01K 63/04* (2006.01)

(52) U.S. Cl.

CPC ............ *A01K 63/006* (2013.01); *A01G 31/02* (2013.01); *A01K 63/04* (2013.01); *A01G 31/065* (2025.01)

(58) Field of Classification Search

CPC .... A01K 63/04; A01K 63/006; A01K 63/003; A01G 31/02; A01G 2031/006; A01G 31/06; A01G 31/065

See application file for complete search history.

(56) References Cited

U.S. PATENT DOCUMENTS 8,677,686 B1 3/2014 Nelson et al.
10,806,131 B2 10/2020 Hori (Continued)

FOREIGN PATENT DOCUMENTS

CN 103999812 A * 8/2014 ............. A01G 31/06
CN 104472334 A * 4/2015 ............. A01G 31/02

(Continued)

OTHER PUBLICATIONS

Extended European Search Report dated Oct. 5, 2023 issued in European Patent Application No. 21808273.3.

(Continued)

*Primary Examiner* — Carly W. Lynch

(74) *Attorney, Agent, or Firm* — The Webb Law Firm

(57) ABSTRACT

A water treatment system 1 includes at least one aquaculture water tank 10 configured to culture water creatures; at least one hydroponic culture water tank 20 configured to hydroponically grow plants; and a water treatment device 30 configured to treat water discharged from the aquaculture water tank 10 and supply the treated water to the hydroponic culture water tank 20. The water treatment device 30 controls the amount of nutrient content for the plants to be supplied to the hydroponic culture water tank 20 by generating the nutrient content from impurities contained in the water discharged from the aquaculture water tank 10 and in a case where the amount of the generated nutrient content is excessive, storing the excessive nutrient content in a storage tank 33.

13 Claims, 12 Drawing Sheets

(56) References Cited

U.S. PATENT DOCUMENTS

| | | | | |
|---|---|---|---|---|
| 2010/0031893 | A1* | 2/2010 | Bodlovich | A01K 61/00 119/227 |
| 2011/0131880 | A1 | 6/2011 | Kloas et al. | |
| 2015/0305313 | A1 | 10/2015 | Licamele | |
| 2017/0325427 | A1* | 11/2017 | Straight | A01K 63/065 |
| 2018/0092337 | A1 | 4/2018 | Hori | |
| 2019/0335722 | A1 | 11/2019 | Vandenborre | |

FOREIGN PATENT DOCUMENTS

| | | | | | |
|---|---|---|---|---|---|
| DE | 102016002201 | A1 | * | 8/2017 | A01K 63/00 |
| JP | H03108422 | A | * | 5/1991 | A01G 31/00 |
| JP | H3160934 | A | | 7/1991 | |
| JP | 2012500635 | A | | 1/2012 | |
| JP | 2014042492 | A | | 3/2014 | |
| JP | 2017201935 | A | * | 11/2017 | A01G 31/00 |
| JP | 2019516414 | A | | 6/2019 | |
| KR | 20200025410 | A | * | 3/2020 | A01C 23/007 |
| KR | 1020200025410 | A | | 3/2020 | |
| WO | 2017138269 | A1 | | 8/2017 | |
| WO | WO-2020168203 | A2 | * | 8/2020 | C12M 1/00 |
| WO | WO-2021040365 | A1 | * | 3/2021 | A01G 31/02 |

OTHER PUBLICATIONS

International Preliminary Report on Patentability (IPRP) of PCT/JP2021/019262, dated Nov. 17, 2022.

* cited by examiner

PRODUCTION SYSTEM, PROGRAM, CONTROL METHOD, AND PRODUCTION METHOD

CROSS-REFERENCE TO RELATED APPLICATIONS

This application is a bypass continuation application of International Application No. PCT/JP2021/019262, filed on May 20, 2021, and claims priority to Japanese Patent Application No. 2020-089171, filed on May 21, 2020, the disclosures of which are hereby incorporated by reference in their entirety.

BACKGROUND OF THE INVENTION

Field of the Invention

The present disclosure relates to a production system, a program, a control method, and a production method.

Description of Related Art

Patent Literature 1 describes a system for cultivating water creatures including a hydroponic culture unit.

CITATION LIST

Patent Literature

Patent Literature 1: Japanese Patent Application Laid-Open No. 2014-42492

SUMMARY OF THE INVENTION

A production system according to an embodiment of the present disclosure includes: an aquaculture water tank configured to culture water creatures; a hydroponic culture water tank configured to hydroponically grow plants; and a water treatment device configured to treat water discharged from the aquaculture water tank and supply the treated water to the hydroponic culture water tank, the water treatment device controlling the amount of nutrient content of for the plants to be supplied to the hydroponic culture water tank by generating the nutrient content from impurities contained in the water discharged from the aquaculture water tank, and in a case where the amount of the generated nutrient content is excessive, storing the excessive nutrient content in a storage tank.

DESCRIPTION OF THE INVENTION

Hereinafter, embodiments of the present disclosure will be described as examples with reference to the drawings. The same reference signs in each drawing denote the same or equivalent components.

First Embodiment

Figure 1:
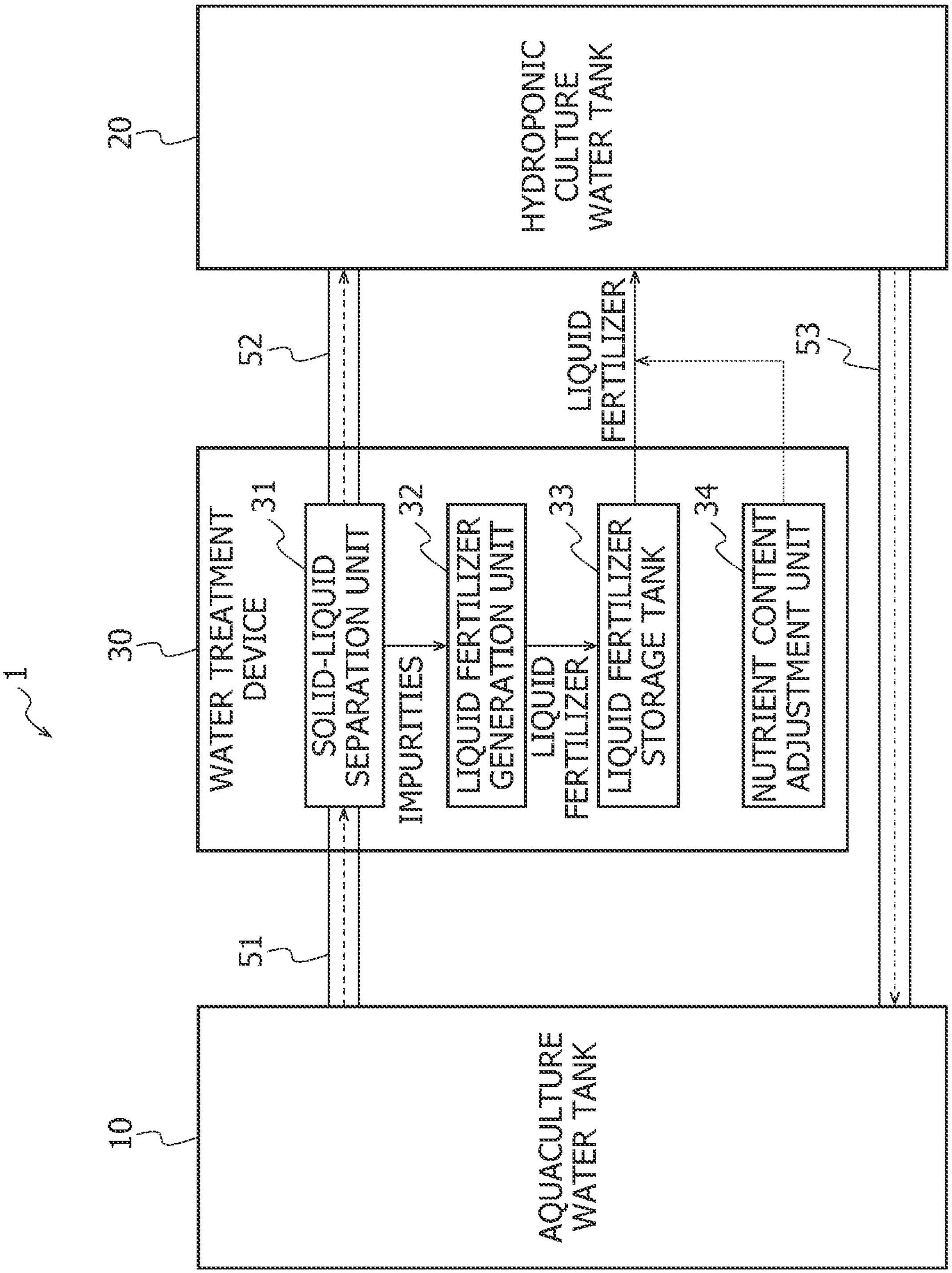
FIG. 1 is a diagram illustrating an example of a configuration of a production system according to a first embodiment of the present disclosure.

FIG. 1 is a diagram illustrating an example of a configuration of a production system 1 according to a first embodiment of the present disclosure. The production system 1 according to the present embodiment is a system for circulating water between aquaculture of water creatures such as fish and shellfish and hydroponic culture of plants.

The production system 1 illustrated in FIG. 1 includes at least one aquaculture water tank 10, at least one hydroponic culture water tank 20, and a water treatment device 30.

The aquaculture water tank 10 is a water tank for culturing water creatures such as fish and shellfish. The aquaculture water tank 10 and the water treatment device 30 are connected to each other via a pipe 51. Discharged water containing impurities such as droppings and leftover feed of the water creatures cultured in the aquaculture water tank 10 is supplied to the water treatment device 30 via the pipe 51.

The hydroponic culture water tank 20 is a water tank for hydroponically growing plants. The hydroponic culture water tank 20 and the water treatment device 30 are connected to each other via a pipe 52, and the hydroponic culture water tank 20 and the aquaculture water tank 10 are connected to each other via a pipe 53. Treated water that has undergone treatment performed by the water treatment device 30, which will be described later, is supplied to the hydroponic culture water tank 20. Also, nutrient content for the hydroponically grown plants is supplied from the water treatment device 30 to the hydroponic culture water tank 20. Water discharged from the hydroponic culture water tank 20 is supplied to the aquaculture water tank 10 via the pipe 53.

The water treatment device 30 constituting the production system 1 is a device that treats water discharged from the aquaculture water tank 10, which has been supplied via the pipe 51, and supplies the treated water to the hydroponic culture water tank 20 via the pipe 52. The water treatment device 30 generates nutrient content for the plants from impurities contained in the water discharged from the aquaculture water tank 10 and supplies the nutrient content to the hydroponic culture water tank 20. Also, the water treatment device 30 controls the supply of the nutrient content to the hydroponic culture water tank 20.

According to the production system 1 illustrated in FIG. 1, the treated water obtained by removing impurities from the water discharged from the aquaculture water tank 10 is supplied to the hydroponic culture water tank 20, and nutrient content is generated from the removed impurities and is then supplied to the hydroponic culture water tank 20. The nutrient content supplied to the hydroponic culture water tank 20 is absorbed by roots of the plants. Therefore, since purified water is supplied from the hydroponic culture water tank 20 to the aquaculture water tank 10, it is possible to save water through circulation of water, and it is possible to reduce efforts for cleaning and performing an operation of changing water. Also, since the nutrient content for the hydroponically grown plants is generated from droppings and the like of the water creatures, it is possible to reduce costs. Furthermore, it is possible to appropriately supply a requisite amount of nutrient content to the hydroponic culture water tank 20 by controlling the supply of the nutrient content to the hydroponic culture water tank 20 and to thereby improve efficiency of the hydroponic culture of the plants. Moreover, since there is no need to adjust the amount of water creatures grown through aquaculture in accordance with the nutrient content to be supplied to the hydroponic culture water tank 20, it is possible to improve efficiency of aquaculture of the water creatures. It is thus possible to improve efficiency of the aquaculture of the water creatures and the hydroponic culture of the plants.

Next, a configuration of the water treatment device 30 will be described with reference to FIG. 1.

As illustrated in FIG. 1, the water treatment device 30 includes a solid-liquid separation unit 31, a liquid fertilizer generation unit 32 that serves as a liquid fertilizer generation means (section), a liquid fertilizer storage tank 33, and a nutrient content adjustment unit 34 that serves as a control means (section).

The solid-liquid separation unit 31 is a filtration device that performs solid-liquid separation of water discharged from the aquaculture water tank 10 and is supplied via the pipe 51 into impurities such as droppings and leftover feed of the water creatures and treated water from which the impurities have been removed. The solid-liquid separation unit 31 supplies the treated water to the hydroponic culture water tank 20 via the pipe 52. The solid-liquid separation unit 31 may perform sterilization of the treated water through a sterilization treatment such as irradiation with ultraviolet light using a UV light or the like or ozone supply before the treated water is supplied to the hydroponic culture water tank 20. The solid-liquid separation unit 31 supplies the separated impurities to the liquid fertilizer generation unit 32. It is possible to use a known filtration device such as a filter or a membrane as the solid-liquid separation unit 31. In a case where a filter or a membrane is used as the solid-liquid separation unit 31, maintenance (washing) of the solid-liquid separation unit 31 is periodically performed (at arbitrary time intervals such as every 1 to 12 hours, for example) through backward flowing using air pressure. It is possible to reduce the effort of cleaning the filter by washing the solid-liquid separation unit 31 through the backward flowing using the air pressure.

The liquid fertilizer generation unit 32 is a device that decomposes the impurities supplied from the solid-liquid separation unit 31 and generates a liquid fertilizer which is nutrient content for the plants. The liquid fertilizer generation unit 32 crushes impurities with large sizes and transforms nitrogen content contained in the impurities into a fertilization component such as a nitrate salt through a biological treatment using aerobes such as bacteria, for example. Aeration is performed to promote activity of the aerobes when the liquid fertilizer is generated. However, the liquid fertilizer generation unit 32 may generate the fertilization component through a biological treatment using not only the aerobes but also anaerobes. Although the present embodiment has been described using the example in which the liquid fertilizer is generated through the biological treatment, the present disclosure is not limited thereto, and an arbitrary method and technique can be used as long as it is possible to generate a liquid fertilizer from impurities. The liquid fertilizer generation unit 32 supplies the generated liquid fertilizer to the liquid fertilizer storage tank 33.

The liquid fertilizer storage tank 33 is a tank that stores the liquid fertilizer generated by the liquid fertilizer generation unit 32. The liquid fertilizer stored in the liquid fertilizer storage tank 33 is supplied to the hydroponic culture water tank 20. The liquid fertilizer stored in the liquid fertilizer storage tank 33 may not only be supplied to the hydroponic culture water tank 20 but may also be appropriately sold, for example. Aeration may be performed in the liquid fertilizer storage tank 33 such that the same state as that in the liquid fertilizer generation unit 32 can be maintained.

The nutrient content adjustment unit 34 controls supply of the liquid fertilizer stored in the liquid fertilizer storage tank 33, that is, the liquid fertilizer generated by the liquid fertilizer generation unit 32, to the hydroponic culture water tank 20. Specifically, the nutrient content adjustment unit 34 controls the amount of nutrient content (the amount of liquid fertilizer to be added) requisite for the hydroponic culture of the plants, which is to be supplied to the hydroponic culture water tank 20. The nutrient content adjustment unit 34 controls, for example, the amounts of added nitrogen, phosphorus, potassium, magnesium, calcium, or iron content which are targets of control. The nutrient content adjustment unit 34 may control only some of these components as targets of control or may add components other than these components as targets of control.

Figure 2:
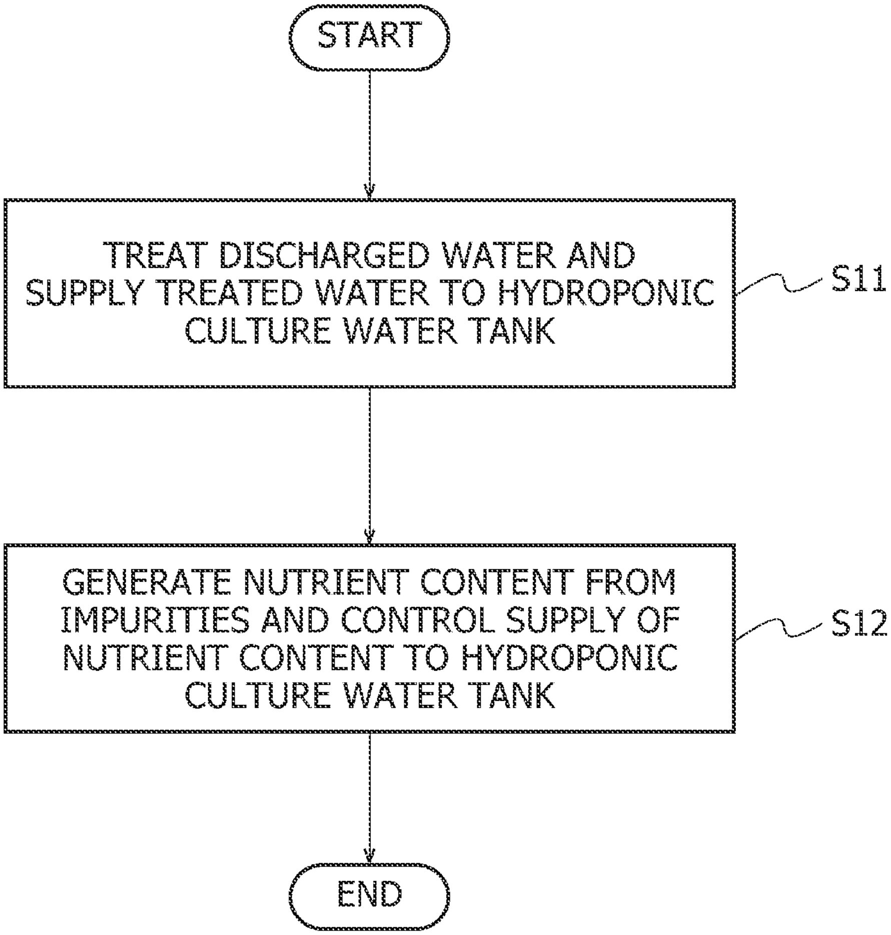
FIG. 2 is a flowchart illustrating an example of operations of a water treatment device illustrated in FIG. 1.

Next, operations of the water treatment device 30 according to the present embodiment will be described. FIG. 2 is a flowchart illustrating an example of operations of the water treatment device 30 according to the present embodiment and is a diagram for explaining a method for controlling the water treatment device 30.

The solid-liquid separation unit 31 treats water discharged from the aquaculture water tank 10 (removes impurities) (Step S11), and the removed impurities are supplied to the liquid fertilizer generation unit 32. The liquid fertilizer generation unit 32 generates nutrient content (liquid fertilizer) for the plants from the impurities supplied from the solid-liquid separation unit 31 and stores the nutrient content in the liquid fertilizer storage tank 33, and the nutrient content adjustment unit 34 thereby controls supply of the nutrient content to the hydroponic culture water tank 20 (Step S12). Note that although the present embodiment will be described on the assumption that the nutrient content generated by the liquid fertilizer generation unit 32 is a liquid fertilizer, the generated nutrient content may be in the form of solid. However, it is more preferable to generate the nutrient content as a liquid fertilizer in order to use it for hydroponic culture.

Figure 3:
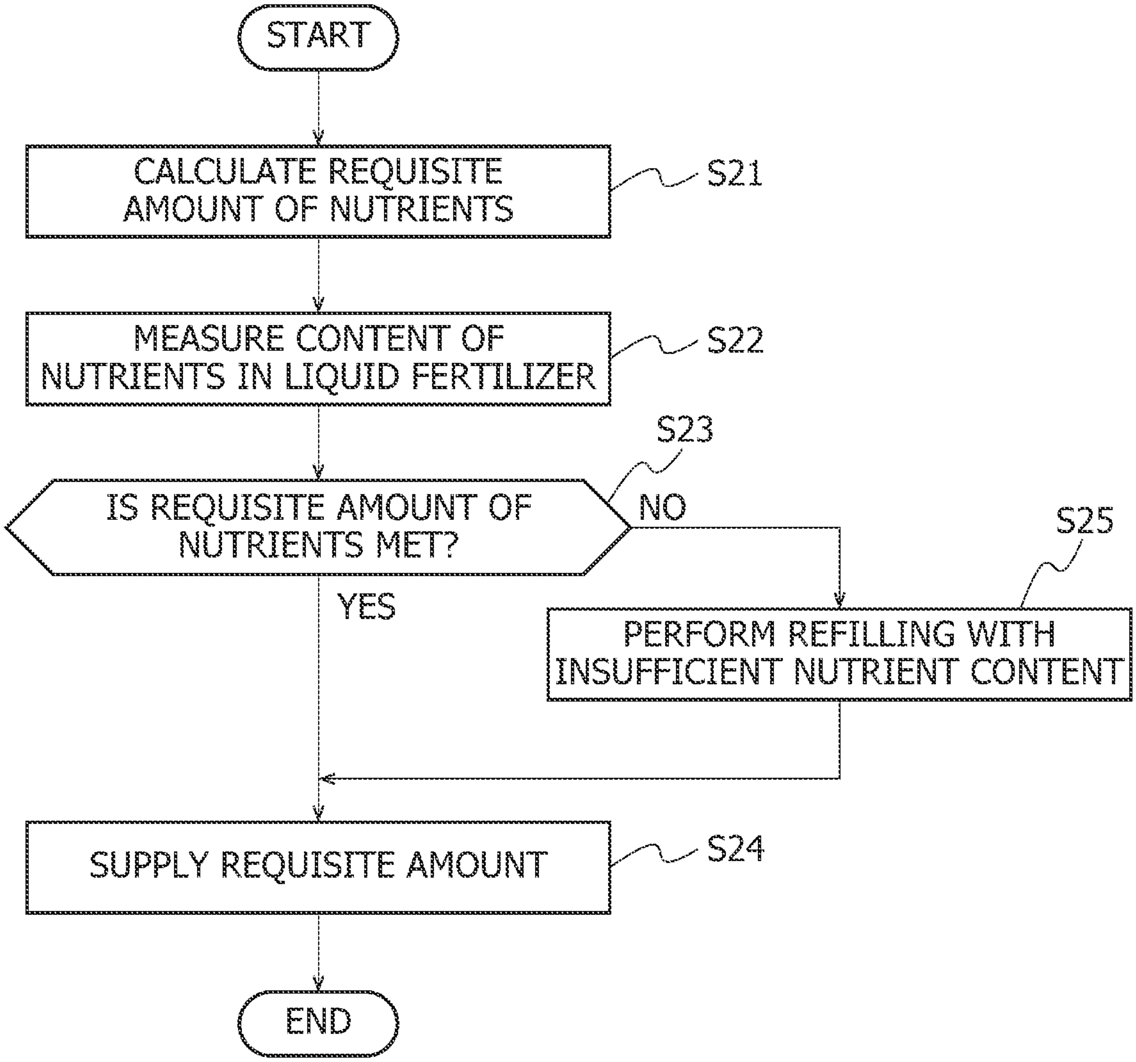
FIG. 3 is a flowchart illustrating an example of operations of a nutrient content adjustment unit illustrated in FIG. 1.

Next, control of the supply of the nutrient control to the hydroponic culture water tank 20 performed by the nutrient content adjustment unit 34 will be described with reference to FIG. 3.

The nutrient content adjustment unit 34 calculates the amount of nutrient content (requisite amount of nutrients) that is requisite for the plants hydroponically grown in the hydroponic culture water tank 20 (Step S21). As nutrients that are requisite for vegetables and the amounts thereof, the requisite amounts in accordance with the types of the vegetables and pH are known. It is known that the concentration of nitrate salt preferably falls within a range of 40 ppm to 160 ppm if pH is 6 to 7 in a case where vegetables are hydroponically grown, for example. Also, it is known that the concentration of nitrate salt preferably falls within a range of 40 ppm to 80 ppm in order to achieve better vegetable tastes and better states of cultured water creatures (fish). The nutrient content adjustment unit 34 calculates the requisite amount of nutrients on the basis of such information, for example. Also, the nutrient content adjustment unit 34 may control the nutrient content to be supplied to the hydroponic culture water tank 20 and the content thereof on the basis of the growth condition of the plants hydroponically cultured.

Next, the nutrient content adjustment unit 34 determines the content of nutrients in the liquid fertilizer stored in the liquid fertilizer storage tank 33 (Step S22). Then, the nutrient content adjustment unit 34 determines whether or not the content of nutrients in the liquid fertilizer satisfies the requisite amount of nutrient (meets the requisite amount of nutrients) (Step S23).

In a case where it is determined that the liquid fertilizer meets the necessary amount of nutrients (Step S23: Yes), the nutrient content adjustment unit 34 supplies only the necessary amount of liquid fertilizer to the hydroponic culture water tank 20 (Step S24).

In a case where it is determined that the liquid fertilizer does not meet the requisite amount of nutrients (Step S23: No), the nutrient content adjustment unit 34 refills the insufficient liquid fertilizer with the nutrient content (Step S25) and supplies only the requisite amount of liquid fertilizer to the hydroponic culture water tank 20. In a case where it is determined that the liquid fertilizer does not meet the requisite amount of nutrients, for example, the nutrient content adjustment unit 34 causes the requisite amount of nutrients to be met by increasing the amount of liquid fertilizer to be supplied from the liquid fertilizer storage tank 33. Also, in a case where the amount of nutrient content is sufficient while specific nutrient content (potassium, for example) is insufficient, the nutrient content adjustment unit 34 performs refilling of the insufficient nutrient content and supplies the liquid fertilizer to the hydroponic culture water tank 20.

In this manner, according to the present embodiment, the water treatment device 30 controls the nutrient content to be supplied to the hydroponic culture water tank 20 and the content thereof on the basis of at least one of the type of the plants to be hydroponically grown in the hydroponic culture water tank 20 and the growth condition of the plants.

In the production system in which water is caused to circulate between aquaculture of water creatures and hydroponic culture of plants, the amount of impurities contained in water discharged from the aquaculture water tank and components contained in the impurities vary depending on the amount of cultured water creatures, the amount of activity of the water creatures (which varies depending on seasons, growth conditions, and the like), and the like. Therefore, there may be a case where it is not possible to secure a requisite amount of nutrients for the hydroponically grown plants if the amount of impurities contained in the water discharged from the aquaculture water tank decreases.

In the related art, an unnecessarily large amount of water creatures have been cultured in order to secure the requisite amount of nutrients for the hydroponically grown plants. Therefore, there may be a case where the amount of nutrient content is excessive depending on a timing or there may be a case where the amount of water creatures is insufficient depending on a timing since the amount of grown water creatures varies due to aquaculture controlled not to culture an excessive amount of water creatures or due to shipping or the like.

On the other hand, according to the production system 1 in the present embodiment, the liquid fertilizer generated from the impurities is stored in the liquid fertilizer storage tank 33, and it is thus possible to save the liquid fertilizer and to appropriately supply a requisite amount of liquid fertilizer to the hydroponic culture water tank 20. In a case where the amount of generated liquid fertilizer is excessive in the hydroponic culture water tank 20, for example, the excessive nutrient content may be stored in the liquid fertilizer storage tank 33. Also, in a case where the generated liquid fertilizer is insufficient in the hydroponic culture water tank 20, refilling with the liquid fertilizer may be performed from the liquid fertilizer storage tank 33. Therefore, it is possible to adjust the amount of liquid fertilizer to be supplied to the hydroponic culture water tank 20 regardless of whether the amount of generated liquid fertilizer is excessive or insufficient. Therefore, in a case where a larger amount of water creatures than the requisite amount for the plants to be hydroponically grown are cultured, or even in a case where the amount of cultured water creatures decreases, it is possible to supply a requisite amount of nutrient content to the hydroponic culture water tank 20. In other words, since there is no need to adjust the amount of water creatures grown in aquaculture in accordance with the nutrient content supplied to the hydroponic culture water tank 20, it is possible to improve efficiency of the aquaculture of the water creatures and the hydroponic culture of the plants.

Also, the nutrient content contained in the generated liquid fertilizer may change depending on components contained in feed of the cultured water creatures and the like. Therefore, in a case where the content of nutrient content (content of nutrients) contained in the liquid fertilizer is measured and there is insufficient nutrient content, it is possible to improve efficiency of the hydroponic culture by performing refilling with the nutrient content and then supplying the liquid fertilizer to the hydroponic culture water tank 20.

In a case where refilling with insufficient nutrient content is performed, the nutrient content for refilling is preferably easily soluble in water. This is because even if nutrient content which is unlikely to be soluble in water is added, this results not only in no effects but also a likelihood of a health hazard for the cultured water creatures in a case where the water discharged from the hydroponic culture water tank 20 is circulated to the aquaculture water tank 10.

Figure 4:
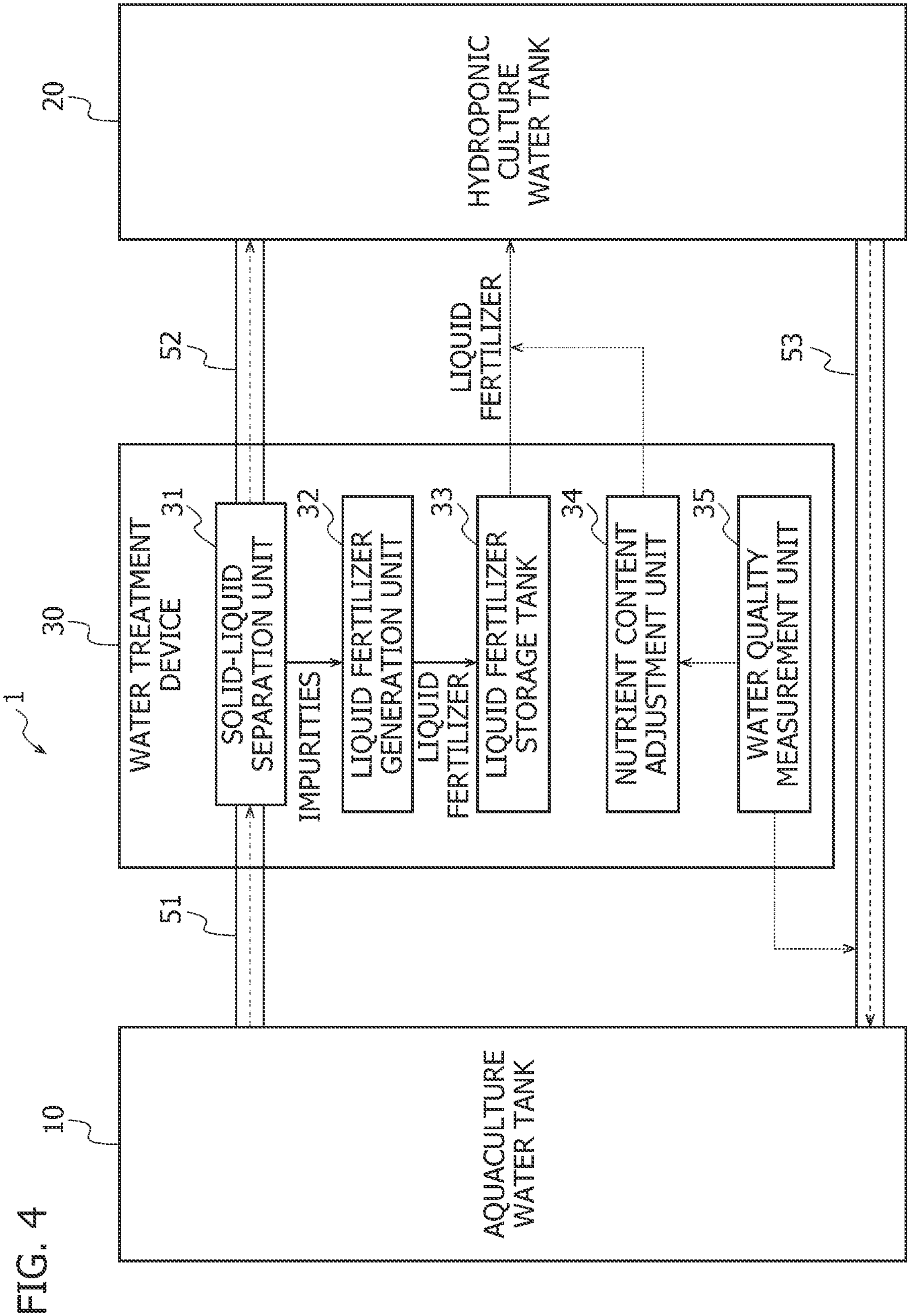
FIG. 4 is a diagram illustrating another example of the configuration of the water treatment device illustrated in FIG. 1.

Thus, in a case where the liquid fertilizer is refilled with nutrient content obtained from the outside, the water treatment device 30 preferably further includes a water quality measurement unit 35 as illustrated in FIG. 4.

The water quality measurement unit 35 measures water quality of water supplied from the hydroponic culture water tank 20 to the aquaculture water tank 10 and outputs the measurement result to the nutrient content adjustment unit 34.

The nutrient content adjustment unit 34 may adjust the nutrient content to be supplied to the hydroponic culture water tank 20 such that there are no influences on the cultured water creatures through refilling with nutrient content on the basis of the measurement result of the water quality measurement unit 35.

Figure 5:
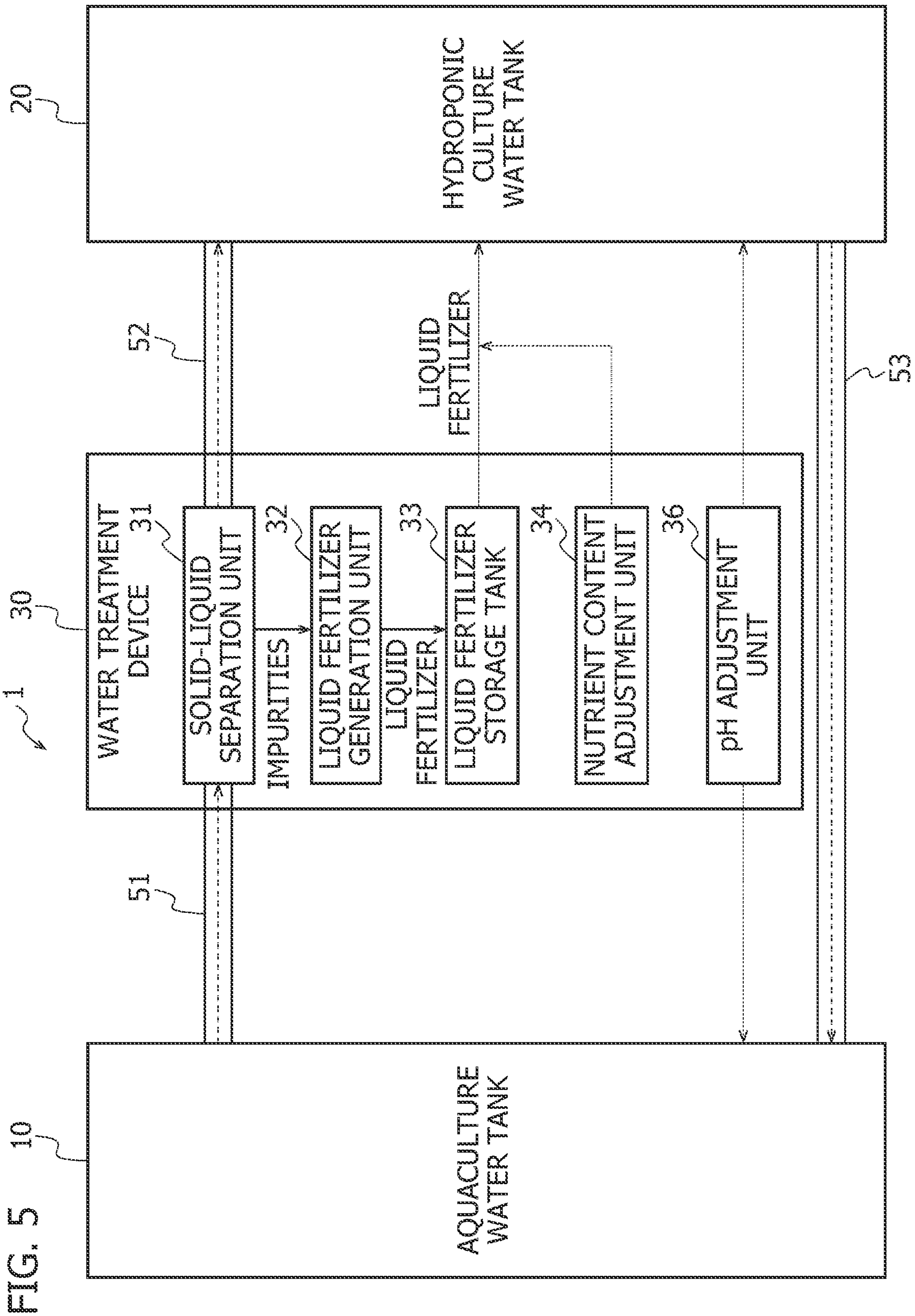
FIG. 5 is a diagram illustrating yet another example of the configuration of the water treatment device illustrated in FIG. 1.

Also, the water treatment device 30 according to the present embodiment may further include a pH adjustment unit 36 as illustrated in FIG. 5.

The pH adjustment unit 36 adjusts pH of at least one of water in the aquaculture water tank 10 and water in the hydroponic culture water tank 20.

When the water discharged from the aquaculture water tank 10 passes through the water treatment device 30 and the hydroponic culture water tank 20, pH thereof decreases. Although pH of the water discharged from the aquaculture water tank 10 and pH of the water treated by the water treatment device 30 are substantially the same values (pH of the treated water is slightly lower), for example, there may be a case where pH of the liquid fertilizer generated by the water treatment device 30 is lower than pH of the water discharged from the aquaculture water tank 10 by about 0.2 (the extent of decrease differs depending on the air temperature, conditions of impurities contained in the discharged water, and the like). Therefore, there may be a case where pH of the water in the hydroponic culture water tank 20 to which the treated water and the liquid fertilizer are supplied is lower than that of the water discharged from the aquaculture water tank 10.

In addition, pH of the water discharged from the hydroponic culture water tank 20 is also lower than pH of the treated water, and pH of water in the aquaculture water tank 10 also drops by the water discharged from the hydroponic culture water tank 20 being circulated and supplied to the aquaculture water tank 10.

Thus, it is possible to keep pH of the water in the aquaculture water tank 10 and the water in the hydroponic culture water tank 20 in an appropriate range by the pH adjustment unit 36 adjusting pH of at least one of the water in the aquaculture water tank 10 and the water in the hydroponic culture water tank 20. The adjustment of pH can be performed by a known method. As a method of adjusting pH, there is a method of adding a pH adjusting agent (chemical), for example. Since it is preferable to use a naturally-derived pH adjusting agent as the pH adjusting agent to be added for growth of the cultured water creatures and the hydroponically grown plants, it is preferable to use oyster shells (calcium carbonate), for example.

It is only necessary for the pH adjustment unit 36 to perform pH adjustment only on one of the water in the aquaculture water tank 10 and the water in the hydroponic culture water tank 20. However, since the cultured water creatures are more strongly affected by pH, it is preferable to perform the pH adjustment on the water in the aquaculture water tank 10 as a target. Note that in a case where appropriate pH differs for the cultured water creatures and the hydroponically grown plants, pH of the water in the aquaculture water tank 10 and pH of the water in the hydroponic culture water tank 20 may be individually adjusted. Although the aforementioned example has been explained using the example in which pH is raised by the pH adjustment unit 36, it is only necessary for the pH adjustment unit 36 to perform adjustment to lower pH in a case where pH of the water in the water tanks (the aquaculture water tank 10 and the hydroponic culture water tank 20) rises. Also, the water treatment device 30 illustrated in FIG. 5 may further include the water quality measurement unit 35.

In this manner, according to the present embodiment, the production system 1 includes the aquaculture water tank 10 configured to culture water creatures, the hydroponic culture water tank 20 configured to hydroponically grow plants, and the water treatment device 30 configured to treat the water discharged from the aquaculture water tank 10 and supply the treated water to the hydroponic culture water tank 20. The water treatment device 30 generates nutrient content for the plants from impurities contained in the water discharged from the aquaculture water tank 10 and controls supply of the nutrient content to the hydroponic culture water tank 20.

It is possible to appropriately supply the requisite amount of nutrient content to the hydroponic culture water tank 20 by generating the nutrient content from the impurities contained in the water discharged from the aquaculture water tank 10 and controlling the supply of the nutrient content to the hydroponic culture water tank 20 and thereby to improve efficiency of the hydroponic culture of the plants. Also, since there is no need to adjust the amount of water creatures grown in the aquaculture in accordance with the nutrient content to be supplied to the hydroponic culture water tank 20, it is possible to improve efficiency of the aquaculture of the water creatures. It is thus possible to improve efficiency of the aquaculture of the water creature and the hydroponic culture of the plants.

Second Embodiment

Figure 6:
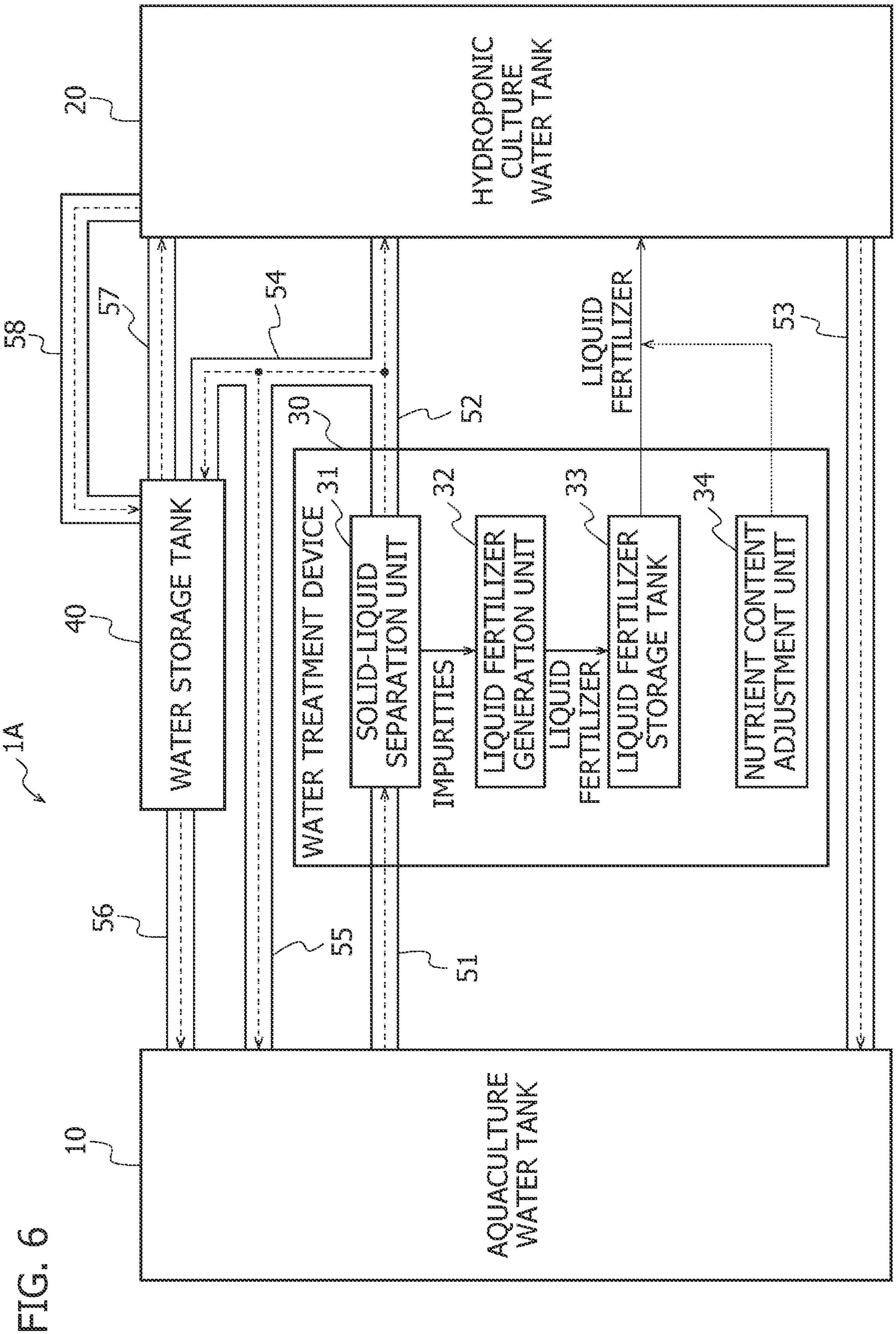
FIG. 6 is a diagram illustrating an example of a configuration of a production system according to a second embodiment of the present disclosure.

FIG. 6 is a diagram illustrating a configuration example of a production system 1A according to a second embodiment of the present disclosure. In FIG. 6, configurations that are similar to those in FIG. 1 are denoted by the same reference signs.

The production system 1A illustrated in FIG. 6 includes an aquaculture water tank 10, a hydroponic culture water tank 20, a water treatment device 30, and a water storage tank 40. In other words, the production system 1A according to the present embodiment is different from the production system 1 illustrated in FIG. 1 in that the water storage tank 40 is added.

The water storage tank 40 is connected to the water treatment device 30 via a pipe 54 branched from a pipe 52. A part of treated water generated by the water treatment device 30 is supplied to the hydroponic culture water tank 20, and the remaining part thereof flows to the pipe 54. The pipe 54 is connected to the water storage tank 40 and is also connected to a pipe 55 connected to the aquaculture water tank 10. A part of the treated water flowing through the pipe 54 is supplied to the water storage tank 40, and the remaining part thereof is supplied to the aquaculture water tank 10 via the pipe 55. The water storage tank 40 is connected to the aquaculture water tank 10 via a pipe 56 and is also connected to the hydroponic culture water tank 20 via pipes 57 and 58. The water storage tank 40 stores the treated water supplied from the water treatment device 30 via the pipe 52 and the pipe 54. Also, the water storage tank 40 stores, as treated water, discharged water supplied from the hydroponic culture water tank 20 via the pipe 58. The water storage tank 40 supplies the stored treated water to the aquaculture water tank 10 via the pipe 56 and supplies the treated water to the hydroponic culture water tank 20 via the pipe 57.

In this manner, the production system 1A according to the present embodiment includes the water storage tank 40 that supplies the stored treated water to the hydroponic culture water tank 20. Also, the production system 1A according to the present embodiment includes the pipe 55 (first pipe) that supplies the treated water from the water treatment device 30 to the aquaculture water tank 10 and the pipe 58 (second pipe) that supplies the water discharged from the hydroponic culture water tank 20 to the water storage tank 40.

Adjustment of the amount of water in the aquaculture water tank 10 and the hydroponic culture water tank 20 is facilitated by supplying the treated water stored in the water storage tank 40 to the aquaculture water tank 10 and the hydroponic culture water tank 20.

Additionally, in the production system 1A according to the present embodiment, it is possible to separately operate (independently operate two systems) a system in which water is circulated between the aquaculture water tank 10 and the water treatment device 30 (first system) and a system in which water is circulated between the hydroponic culture water tank 20 and the water treatment device 30 (second system).

In a case where a balance between the amount of water creatures cultured in the aquaculture water tank 10 and the amount of plants grown in the hydroponic culture water tank 20 is poor, for example, the two systems may be separately operated. Also, in a case where refilling with nutrient content from the outside is performed, the two systems may be separately operated in order to reduce influences on the cultured water creatures. In other words, according to the production system 1A illustrated in FIG. 6, it is possible to operate the first system and the second system in conjunction with each other similarly to the production system 1 illustrated in FIG. 1 and to separately operate the first system and the second system in accordance with a situation.

It is possible to independently operate the two systems and thereby to stably run the other system even in a case where one of the system is stopped for cleaning or the like. Also, it is possible to downsize the pump provided in each system, that is, it is possible to perform driving with two small pumps, and thereby to reduce equipment cost and running cost. Also, it is possible to cause the other system to continuously operate even in a case where a pump provided on one of the systems breaks down, and thereby to reduce a risk in which the breakdown of one of the systems affects the other system.

Also, the cooperation and separation of the two systems may be switched in accordance with the situation in the production system 1A as described above. Water may be circulated in the entire production system 1A (between the first system and the second system) within a range in which it is possible to maintain the balance between the aquaculture of water creatures and the hydroponic culture of plants, and the first system and the second system may be individually operated if the balance becomes worse, by enabling switching between cooperation and separation between the two systems.

Note that the water treatment device 30 constituting the production system 1A illustrated in FIG. 6 may include at least one of the water quality measurement unit 35 and the pH adjustment unit 36.

Third Embodiment

Figure 7:
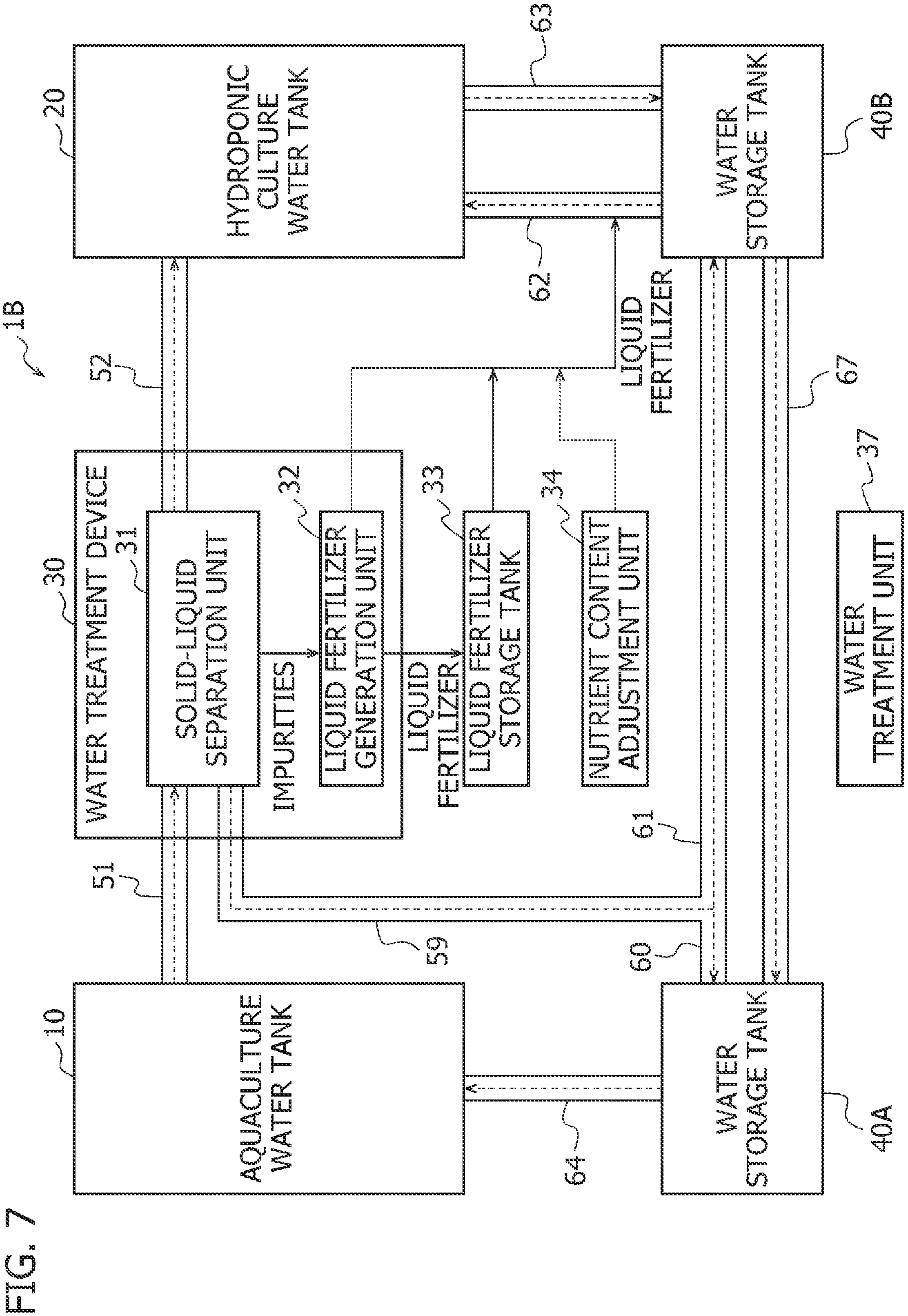
FIG. 7 is a diagram illustrating an example of a configuration of a production system according to a third embodiment of the present disclosure.

FIG. 7 is a diagram illustrating a configuration example of a production system 1B according to a third embodiment of the present disclosure. In FIG. 7, configurations that are similar to those in FIG. 1 are denoted by the same reference signs.

The production system 1B illustrated in FIG. 7 includes an aquaculture water tank 10, a hydroponic culture water tank 20, a water treatment device 30, a liquid fertilizer storage tank 33, a nutrient content adjustment unit 34, a water treatment unit 37, and two water storage tanks 40A and 40B. In short, the production system 1B according to the present embodiment is different from the production system 1 according to the first embodiment in that the liquid fertilizer storage tank 33 and the nutrient content adjustment unit 34 are separated from the water treatment device 30 and that the water storage tanks 40A and 40B are added. Note that the liquid fertilizer storage tank 33 and the nutrient content adjustment unit 34 may be included in the water treatment device 30 similarly to the production system 1 illustrated in FIG. 1.

The water storage tank 40A is a tank that stores at least one of water from the water storage tank 40B and treated water from a solid-liquid separation unit 31 in the water treatment device 30 and supplies the stored water to the aquaculture water tank 10. In the example illustrated in FIG. 7, the water storage tank 40A is connected to the solid-liquid separation unit 31 in the water treatment device 30 via pipes 59 and 60. At least a part of the treated water from the solid-liquid separation unit 31 can be supplied to the water storage tank 40A via the pipes 59 and 60. Also, the water storage tank 40A is connected to the aquaculture water tank 10 via a pipe 64. Water stored in the water storage tank 40A is supplied to the aquaculture water tank 10 via the pipe 64. Also, the water storage tank 40A is connected to the water storage tank 40B via a pipe 67. Water stored in the water storage tank 40B is supplied to the water storage tank 40A via the pipe 67.

The water storage tank 40B is a tank that stores water discharged from the hydroponic culture water tank 20 and supplies the stored water to at least one of the hydroponic culture water tank 20 and the water storage tank 40A. In the example illustrated in FIG. 7, the water storage tank 40B is connected to the solid-liquid separation unit 31 in the water treatment device 30 via the pipes 59 and 61. At least a part of the treated water from the solid-liquid separation unit 31 is supplied to the water storage tank 40B via the pipes 59 and 61. Also, the water storage tank 40B is connected to the hydroponic culture water tank 20 via pipes 62 and 63. The water stored in the water storage tank 40B is supplied to the hydroponic culture water tank 20 via the pipe 62. The water discharged from the hydroponic culture water tank 20 is supplied to the water storage tank 40B via the pipe 63. Therefore, water can be circulated between the water storage tank 40B and the hydroponic culture water tank 20. Also, the water storage tank 40B is connected to the water storage tank 40A via the pipe 67 as described above. The water stored in the water storage tank 40B is supplied to the water storage tank 40A via the pipe 67. Note that the connection relationship of the hydroponic culture water tank 20 and the water storage tanks 40A and 40B can be an arbitrary configuration as long as it is possible to supply water as described above. For example, a pipe 53 from the hydroponic culture water tank 20 to the aquaculture water tank 10 may be provided similarly to the production system 1 illustrated in FIG. 1, and water may be supplied to the water storage tanks 40A and 40B via a pipe branched from the pipe 53.

The water treatment unit 37 includes one or more water treatment devices, each of which performs a predetermined water treatment. Here, although the "predetermined water treatment" includes, for example, a desalination treatment, a sterilization treatment, a pH adjustment treatment, a treatment for adjusting the concentration of dissolved oxygen, and a treatment for adjusting the concentration of dissolved carbon dioxide, and the like, the "predetermined water treatment" is not limited thereto and may include an arbitrary water treatment for adjusting water quality. In a case where the predetermined water treatment includes the desalination treatment, it is also possible to set water quality in one of the aquaculture water tank 10 and the hydroponic culture water tank 20 as sea water while setting water quality in the other one of them as fresh water, for example. In a case where the predetermined water treatment includes the pH adjustment treatment, the water treatment unit 37 may include, as a water treatment device, the pH adjustment unit 36. Each water treatment device may include a sensor for detecting water quality of water as a target of the water treatment, for example. For example, the water treatment unit 37 may include the water quality measurement unit 35 as the sensor. Each water treatment device included in the water treatment unit 37 may be disposed inside the production system 1B such that the water treatment can be performed on water in the arbitrary pipes, water tanks, and tanks included in the production system 1B. For example, the water treatment unit 37 may be able to perform the water treatment on water flowing through each of the pipes 59, 60, 61, 63, 64, and 67.

Also, the water treatment unit 37 may perform the water treatment on the entire amount of water flowing through each pipe or may perform the water treatment on a part of the water flowing through each pipe in accordance with a processing ability of the water treatment apparatus. For example, there may be a case where components (minerals, bacteria, and the like) other than base are removed by a desalination device. Therefore, only a part of water may be caused to pass through the desalination device by branching the pipes, for example, and water quality of the entire amount of water passing through the pipe may be adjusted.

Also, the water treatment unit 37 may perform a sterilization treatment on the treatment water supplied from the solid-liquid separation unit 31 to the water storage tanks 40A and 40B (water flowing through the pipe 59, for example), for example. The water treatment unit 37 may perform a treatment of increasing the concentration of dissolved oxygen on water supplied from the water storage tank 40B to the hydroponic culture water tank 20 (water flowing through the pipe 62, for example). The water treatment unit 37 may perform at least one of the desalination treatment and the sterilization treatment on water supplied from the water storage tank 40B to the water storage tank 40A (water flowing through the pipe 67, for example). In a case where the desalination treatment is performed, components (such as Fe, Mg, and Ca, for example) that are not useful for the water creatures that can be contained in the discharged water supplied from the hydroponic culture water tank 20 to the water storage tank 40A via the water storage tank 40B can be removed. The water treatment unit 37 may perform a treatment for reducing the concentration of dissolved carbon dioxide on water inside the water storage tank 40A. The water treatment unit 37 may perform a treatment for increasing the concentration of dissolved oxygen on water supplied from the water storage tank 40A to the aquaculture water tank 10 (water flowing through the pipe 64, for example). The water treatment unit 37 may perform a treatment for reducing the concentration of dissolved carbon dioxide on water in the aquaculture water tank 10.

Also, in the present embodiment, the liquid fertilizer is supplied to the water flowing through the pipe 62, that is, the water supplied from the water storage tank 40B to the hydroponic culture water tank 20. In the example illustrated in FIG. 7, the liquid fertilizer is supplied from at least one of the liquid fertilizer generation unit 32 and the liquid fertilizer storage tank 33 to the pipe 62. However, the liquid fertilizer may be supplied to the water storage tank 40B rather than the pipe 62. In this case, the water treatment unit 37 preferably performs the predetermined water treatment at an arbitrary position while the water in the water storage tank 40B is supplied to the aquaculture water tank 10 via the water storage tank 40A, the pipe 67, and the pipe 64, or alternatively, an appropriate water treatment may be performed in accordance with water quality in the water storage tank 40B. Additionally, in the present embodiment, the liquid fertilizer may be supplied from at least one of the liquid fertilizer generation unit 32 and the liquid fertilizer storage tank 33 to water flowing through the pipe 52, that is, the treatment water supplied from the solid-liquid separation unit 31 to the hydroponic culture water tank 20.

Moreover, the production system 1B may include a filtration device, such as a filter, for example, in at least one of the water storage tank 40A and the pipe 64. The filtration device removes impurities contained in water supplied to the aquaculture water tank 10 via the water storage tank 40A.

In this manner, in the production system 1B according to the present embodiment, the water storage tank 40A that supplies water to the aquaculture water tank 10 and the water storage tank 40B that supplies water to the hydroponic culture water tank 20 are independently provided. Therefore, it is possible to perform a water treatment suitable for the aquaculture of the water creatures on the water supplied to the aquaculture water tank 10 via the water storage tank 40A, for example, and to perform a water treatment suitable for the hydroponic culture of the plants on the water supplied to the hydroponic culture water tank 20 via the water storage tank 40B.

Also, the production system 1B according to the present embodiment may include a water stopping means (section) such as a water stopping valve in one or more arbitrary pipes. For example, the water stopping means (section) may be provided in each of the pipes 52, 59, 60, 61, and 67.

Figure 8:
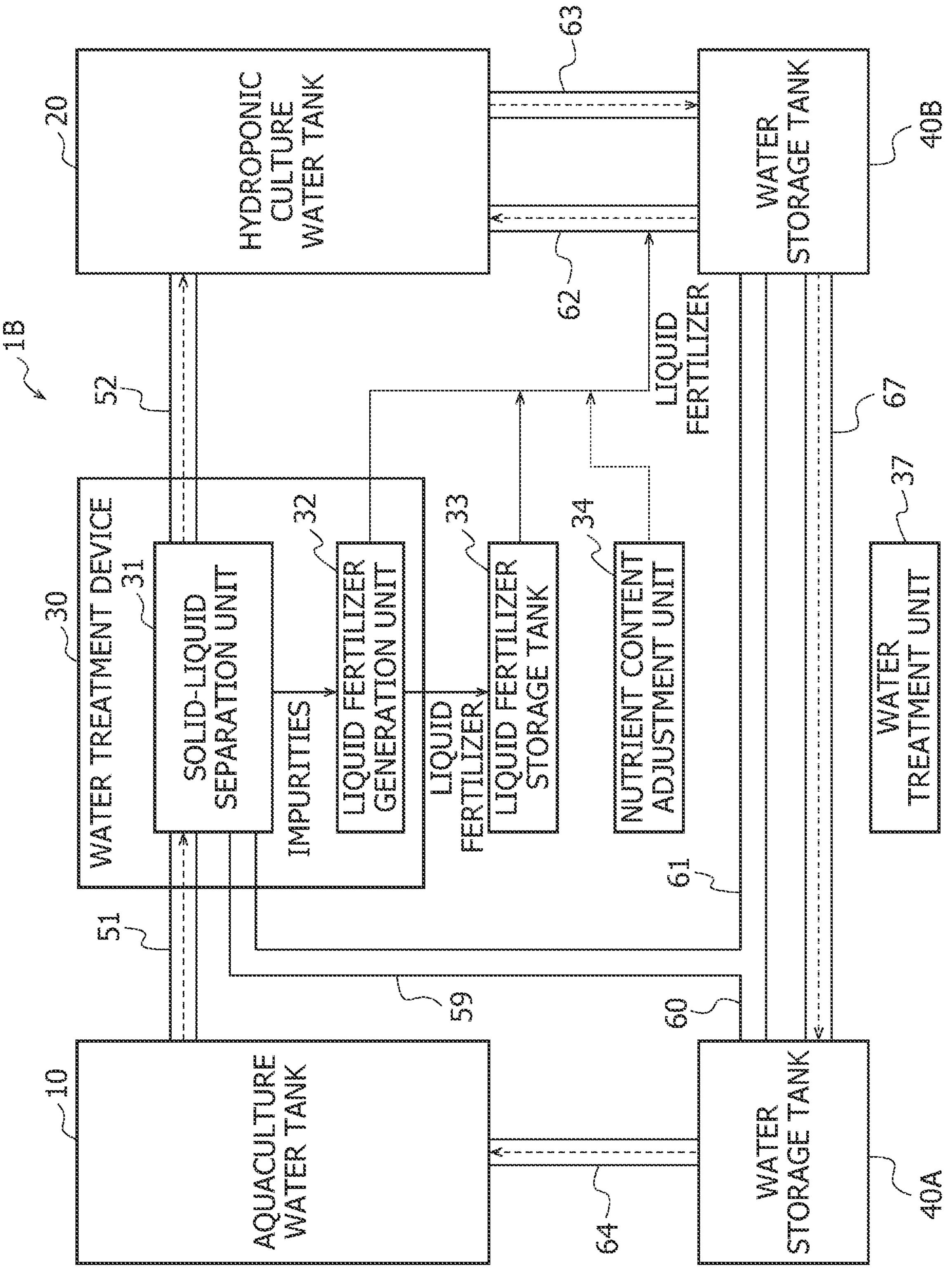
FIG. 8 is a diagram illustrating an example of operations of the production system illustrated in FIG. 7.
Figure 9:
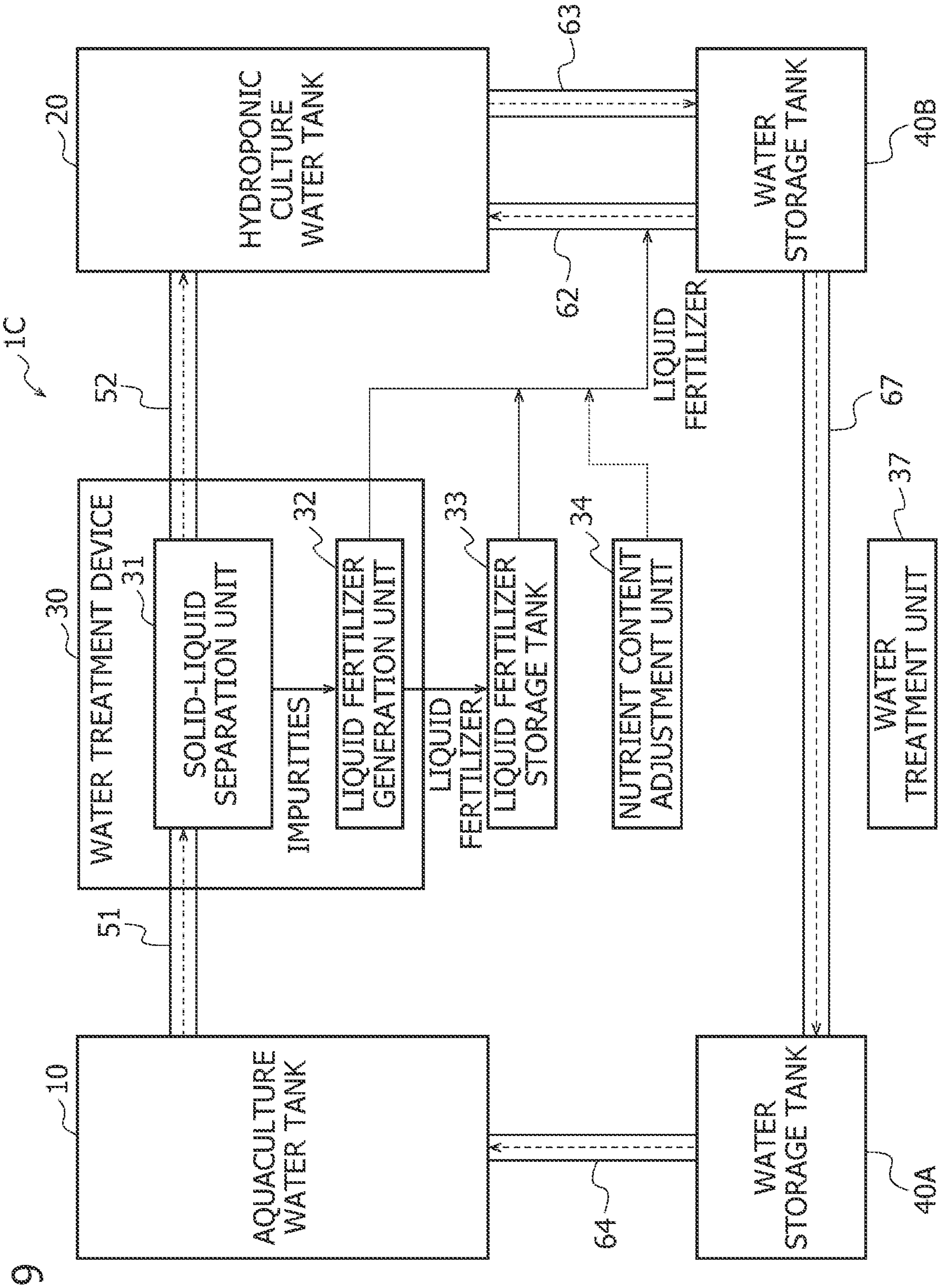
FIG. 9 is a diagram illustrating an example of a configuration of a production system according to a modification example of the third embodiment.

FIG. 8 illustrates a state in which water in the pipes 60 and 61 in the production system 1B is stopped. In regard to the position where water is stopped, water in both the pipes 60 and 61 may be stopped, or water in the upstream pipe 59 may be stopped. The treated water from the solid-liquid separation unit 31 is supplied to the hydroponic culture water tank 20 via the pipe 52 even in the state illustrated in FIG. 8 similarly to the production system 1 illustrated in FIG. 1. Also, the water treatment unit 37 may change the type and content of the water treatment to be performed if the state illustrated in FIG. 7 (that is, the state where water in both the pipes is not stopped) is changed to the state illustrated in FIG. 8. For example, the water treatment unit 37 may perform both the desalination treatment and the sterilization treatment on the water supplied from the water storage tank 40B to the aquaculture water tank 10 via the water storage tank 40A (for example, water in the pipe 67, the water storage tank 40A, or the pipe 64) if the water in the pipes 60 and 61 is stopped as illustrated in FIG. 8. The production system 1B can continuously run even if the state illustrated in FIG. 8 (that is, the state where the water in the pipes 60 and 61 is stopped) is achieved. Therefore, it is also possible to realize a production system 1C as a modification example of the third embodiment as illustrated in FIG. 9, for example. The production system 1C is different from the aforementioned production system 1B in that the pipes 59, 60, and 61 are not included. The production system 1C can be installed at lower cost than the aforementioned production system 1B.

Figure 10:
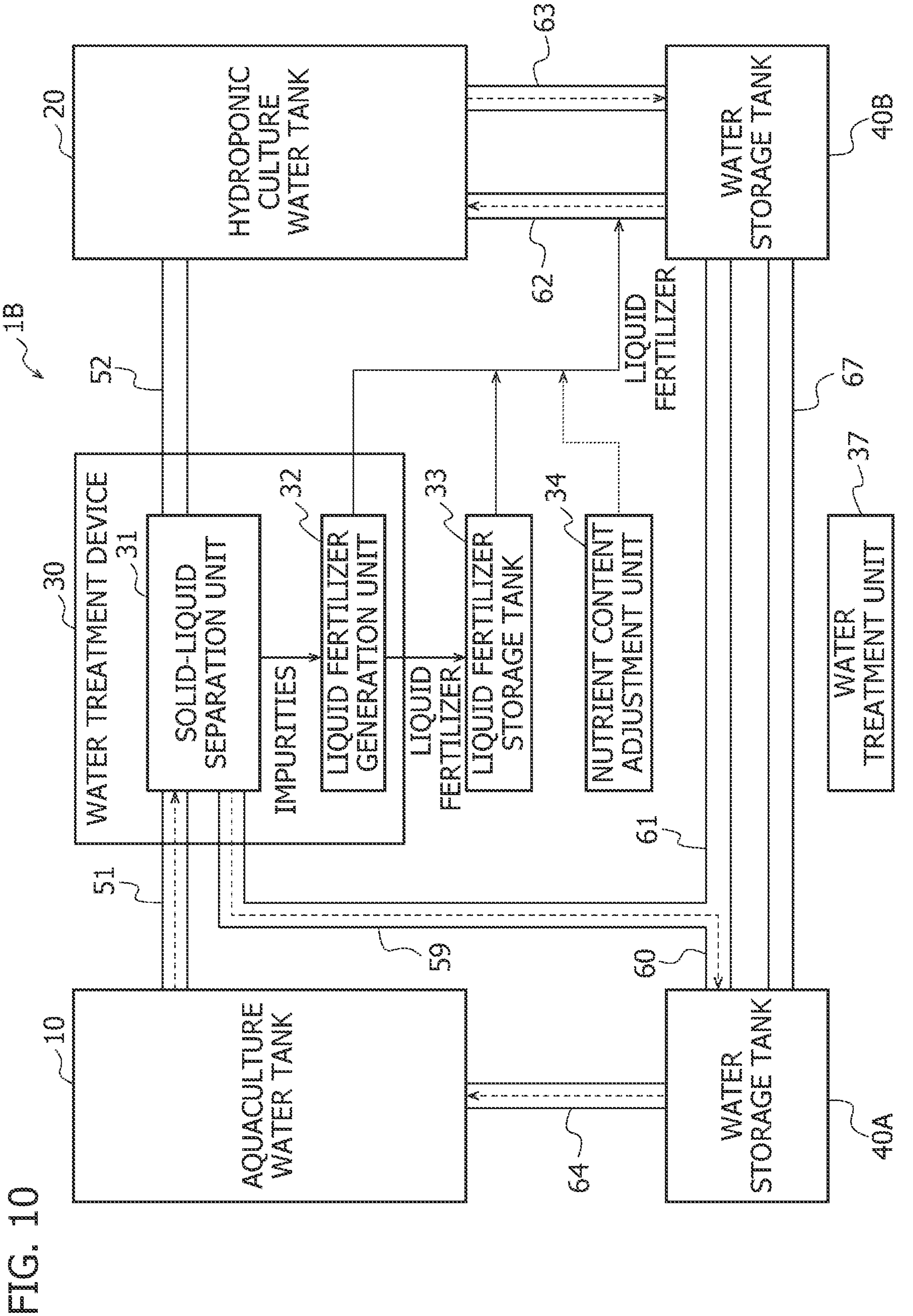
FIG. 10 is a diagram illustrating an example of operations of the production system illustrated in FIG. 7.

Also, FIG. 10 illustrates a state where water in the pipes 52, 61, and 67 in the production system 1B is stopped. In the state illustrated in FIG. 10, the treated water from the solid-liquid separation unit 31 is not supplied to both the hydroponic culture water tank 20 and the water storage tank 40B, and water is circulated between the hydroponic culture water tank 20 and the water storage tank 40B. On the other hand, water in the hydroponic culture water tank 20 and the water storage tank 40B is not supplied to both the aquaculture water tank 10 and the water storage tank 40A, and water is circulated among the aquaculture water tank 10, the water treatment device 30, and the water storage tank 40A. In this manner, it is possible to operate the system 1B by separating the system in which water is circulated among the aquaculture water tank 10, the water treatment device 30, and the water storage tank 40A and the system in which water is circulated between the hydroponic culture water tank 20 and the water storage tank 40B by achieving the state illustrated in FIG. 10. According to such a configuration, in a case where a maintenance work such as cleaning is performed on the production system 1B, for example, only one of the two systems may be stopped. Therefore, there is no need to stop the entire production system 1B when the maintenance work is performed on the production system 1B, and it is thus possible to suppress degradation of operation efficiency of the production system 1B due to the performed maintenance work.

Fourth Embodiment

Figure 11:
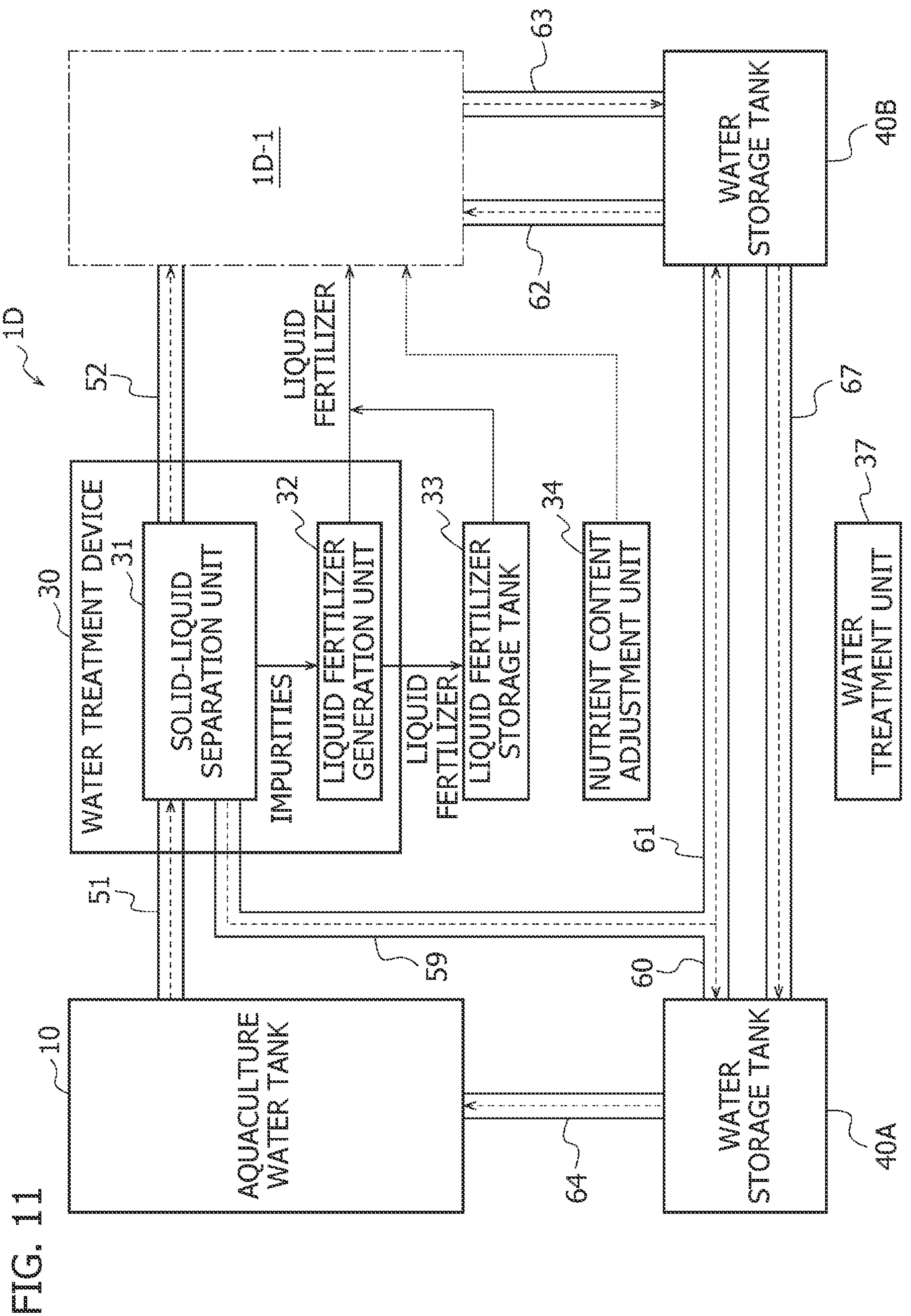
FIG. 11 is a diagram illustrating an example of a configuration of a production system according to a fourth embodiment of the present disclosure.
Figure 12:
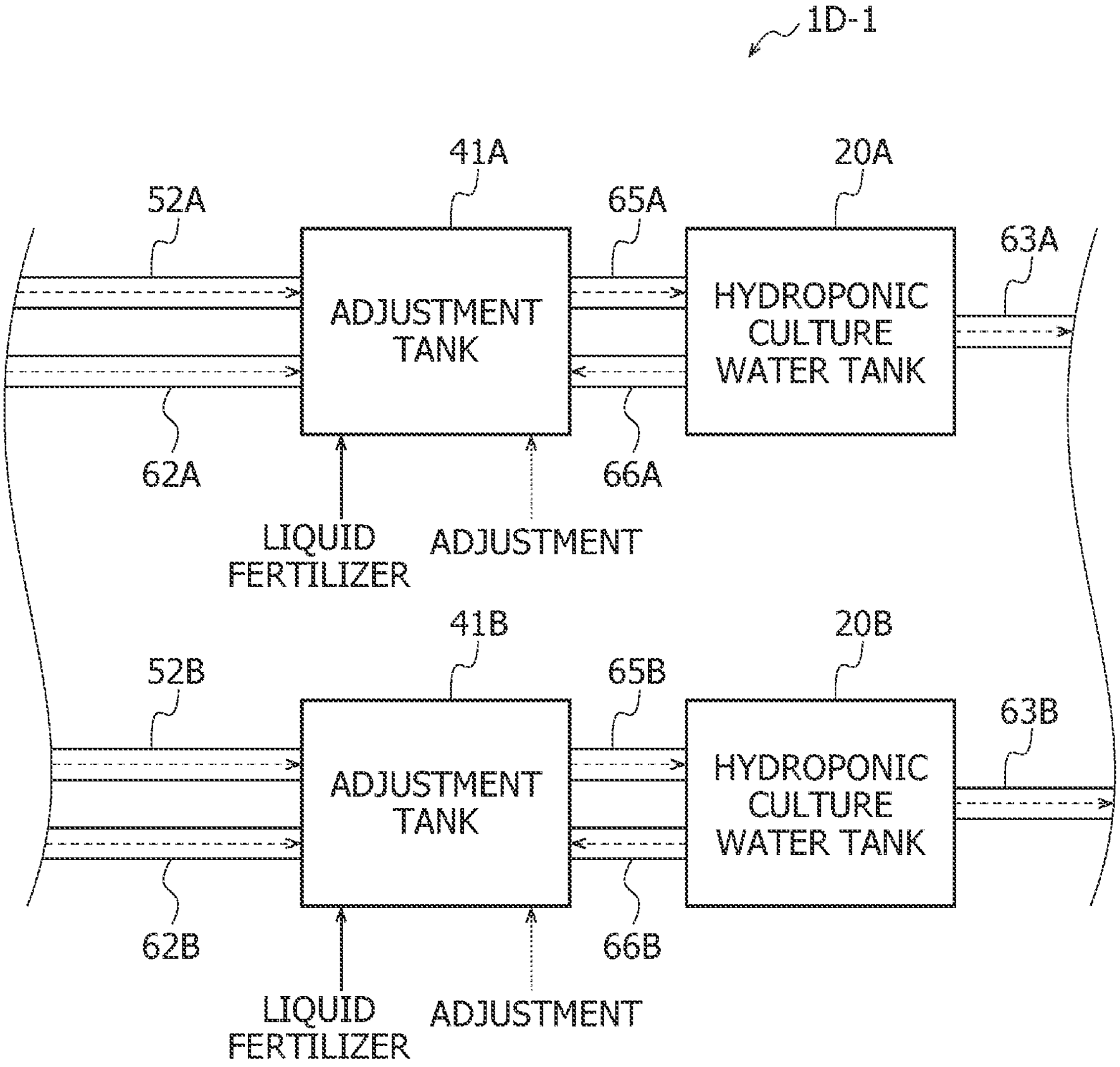
FIG. 12 is a diagram illustrating an example of a configuration of main parts in the production system illustrated in FIG. 11.

FIGS. 11 and 12 are diagrams illustrating a configuration example of a production system 1D according to a fourth embodiment of the present disclosure. In FIGS. 11 and 12, configurations that are similar to those in FIG. 7 are denoted by the same reference signs. In short, the production system 1D is different from the production system 1B illustrated in FIG. 7 in that a plurality of hydroponic culture water tanks 20 and a plurality of adjustment tanks 41 are included. Note that although two hydroponic culture water tanks 20A and 20B and two adjustment tanks 41A and 41B are illustrated in FIG. 11, the production system 1D may include three or more hydroponic culture water tanks 20 and three or more adjustment tanks 41. Each of pipes 52A and 52B illustrated in FIG. 12 is a pipe branched from the pipe 52 illustrated in FIG. 11 on the downstream side. Similarly, each of pipes 62A and 62B is a pipe branched from the pipe 62 on the downstream side, and each of pipes 63A and 63B is a pipe branched from the pipe 63 on the upstream side.

The plurality of adjustment tanks 41 are a plurality of tanks provided respectively corresponding to the plurality of hydroponic culture water tanks 20. Each adjustment tank 41 stores at least one of treated water from the solid-liquid separation unit 31 in the water treatment device 30 and water from the water storage tank 40B and supplies the stored tank to the corresponding hydroponic culture water tank 20. Each adjustment tank 41 may store water from the corresponding hydroponic culture water tank 20. In the example illustrated in FIGS. 11 and 12, the adjustment tank 41A is connected to the solid-liquid separation unit 31 in the water treatment device 30 via the pipes 52 and 52A. Treated water from the solid-liquid separation unit 31 is supplied to the adjustment tank 41A via the pipes 52 and 52A. Also, the adjustment tank 41A is connected to the water storage tank 40B via the pipes 62 and 62A. Water from the water storage tank 40B is supplied to the adjustment tank 41A via the pipes 62 and 62A. Additionally, the adjustment tank 41A is connected to the corresponding hydroponic culture water tank 20A via the pipes 65A and 66A. Water stored in the adjustment tank 41A is supplied to the hydroponic culture water tank 20A via the pipe 65A. At least a part of water discharged from the hydroponic culture water tank 20A is supplied to the adjustment tank 41A via the pipe 66A. Therefore, water can be circulated between the corresponding adjustment tank 41A and the hydroponic culture water tank 20A. The hydroponic culture water tank 20A is connected to the water storage tank 40B via the pipes 63 and 63A. At least a part of water discharged from the hydroponic culture water tank 20A is supplied to the water storage tank 40B via the pipes 63 and 63A.

Note that the pipe 66A that supplies water from the hydroponic culture water tank 20A to the adjustment tank 41A may be omitted. In such a case, water is not circulated between the adjustment tank 41A and the hydroponic culture water tank 20A, and water discharged from the hydroponic culture water tank 20A is supplied only to the water storage tank 40B.

Moreover, the adjustment tank 41B and the hydroponic culture water tank 20B are similar to the adjustment tank 41A and the hydroponic culture water tank 20A.

In addition, a plurality of aquaculture water tanks 10 may be provided. In this case, the pipe 64 may be branched on the downstream side and connected to each aquaculture water tank 10, and water from the water storage tank 40A is supplied to each aquaculture water tank 10. Also, the pipe 51 may be branched on the upstream side and connected to each aquaculture water tank 10, and water discharged from each aquaculture water tank 10 is supplied to the water treatment device 30.

In the present embodiment, the liquid fertilizer generated by the liquid fertilizer generation unit 32 in the water treatment device 30 is supplied to each of the plurality of adjustment tanks 41, and the amount of supplied liquid fertilizer is independently controlled for each adjustment tank 41 by the nutrient content adjustment unit 34. As a result, the amount of supplied liquid fertilizer to each of the plurality of hydroponic culture water tanks 20 is independently controlled. Note that although the number of nutrient content adjustment units 34 illustrated in FIG. 11 is one, the number of nutrient content adjustment units 34 included in the production system 1D may be two or more. For example, the production system 1D may include a plurality of nutrient content adjustment units 34 respectively corresponding to the plurality of adjustment tanks 41. In such a case, each of the plurality of nutrient content adjustment units 34 controls the amount of liquid fertilizer supplied to the corresponding adjustment tank 41.

In this manner, the production system 1D according to the present embodiment includes the plurality of hydroponic culture water tanks 20. Also, the amount of liquid fertilizer supplied to each of the plurality of hydroponic culture water tanks 20 is independently controlled. Therefore, it is possible to grow a plurality of plants of different types, for example, in parallel.

Although the present disclosure has been described on the basis of the various drawings and embodiments, those skilled in the art should note that (will appreciate that) it is easy to make various modifications and revisions on the basis of the present disclosure. Therefore, it should be noted (it will be appreciated that) these modifications and revisions are also included in the scope of the present disclosure. For example, functions included in each means (section), each step, and the like may be rearranged unless they are logically inconsistent, and it is possible to combine a plurality of means (sections), steps, and the like into one or split them. It is needless to say that the above description is just illustrative embodiments of the present disclosure and various changes may be added within the scope of the claims.

Also, although the various means (sections) realized by the water treatment device 30 has been described as a software configuration in the aforementioned embodiments, at least some of the means (sections) may be a concept including a software resource and/or a hardware resource.

Also, it is possible to use an apparatus such as a computer or a mobile phone to cause it to function as the water treatment device 30 according to the aforementioned embodiments. The device can be realized by storing a program describing processing content for realizing each function of the water treatment device 30 according to the embodiments in a memory in the device and by causing a processor in the device to read and execute the program.

REFERENCE SIGNS LIST

1, 1A, 1B, 1C, 1D Production system
10 Aquaculture water tank
20, 20A, 20B Hydroponic culture water tank
30 Water treatment device
31 Solid-liquid separation unit
32 Liquid fertilizer generation unit (liquid fertilizer generation means)
33 Liquid fertilizer storage tank
34 Nutrient content adjustment unit (control means)
35 Water quality measurement unit
36 pH adjustment unit
37 Water treatment unit
40, 40A, 40B Water storage tank
41, 41A, 41B Adjustment tank
51 to 67 Pipe

The invention claimed is:

1. A production system comprising:
at least one aquaculture water tank configured to culture water creatures;
at least one hydroponic culture water tank configured to hydroponically grow plants;
a water treatment device configured to treat water discharged from the at least one aquaculture water tank and supply the treated water to the at least one hydroponic culture water tank, the water treatment device including:
a solid-liquid separation unit that separates impurities and solid-liquid separation liquid from the water discharged from the at least one aquaculture water tank, thereby generating treated water that is supplied to the at least one hydroponic culture water tank and the separated impurities used to generate a liquid fertilizer; and
a liquid fertilizer storage tank that stores the liquid fertilizer generated from the separated impurities supplied by the solid-liquid separation unit, the liquid fertilizer storage tank configured to supply the liquid fertilizer to the at least one hydroponic culture water tank;
a first pipe configured to supply the treated water from the water treatment device to the at least one hydroponic culture water tank;
a first tank;
a second tank; and
a second pipe configured to supply the treated water from the water treatment device to the first tank and the second tank; wherein
the first tank stores water discharged from the at least one hydroponic culture water tank and the treated water from the water treatment device and supplies the water discharged from the at least one hydroponic culture water tank and the treated water from the water treatment device to the at least one hydroponic culture water tank and the second tank, wherein the first tank supplies the water discharged from the at least one hydroponic culture water tank and the treated water from the water treatment device directly to the at least one hydroponic culture water tank, and
the second tank stores the water discharged from the first tank and treated water discharged from the water treatment device via the second pipe and supplies the water discharged from the first tank and treated water discharged from the water treatment device to the at least one aquaculture water tank.

2. The production system according to claim 1, wherein the water treatment device controls the amount of a nutrient content for the plants to be supplied to the at least one hydroponic culture water tank by generating the nutrient content from the impurities contained in the water discharged from the at least one aquaculture water tank, in a case where the amount of the generated nutrient content is excessive, storing the excessive nutrient content in the liquid fertilizer storage tank that stores the nutrient content, and performing refilling from the liquid fertilizer storage tank in a case where the amount of the generated nutrient content is insufficient.

3. The production system according to claim 1, wherein water treatment including at least one of desalination treatment and sterilization treatment is performed on the water to be supplied from the first tank to the at least one aquaculture water tank via the second tank.

4. The production system according to claim 1, wherein
the water treatment device controls a nutrient content to be supplied to the at least one hydroponic culture water tank and the content thereof on the basis of at least one of the type of the plants to be hydroponically grown in the at least one hydroponic culture water tank and a growing condition of the plants to be hydroponically grown in the at least one hydroponic culture water tank.

5. The production system according to claim 1, further comprising:
a plurality of hydroponic culture water tanks; and
a plurality of third tanks, wherein
the plurality of third tanks are provided to correspond to each of the plurality of hydroponic culture water tanks,
each of the third tanks stores the treated water from the water treatment device, supplies the stored water to the corresponding hydroponic culture water tank, and stores water from the corresponding hydroponic culture water tank, and
the amount of nutrient content to be supplied to each of the plurality of hydroponic culture water tanks is independently controlled by the nutrient content generated by the water treatment device being supplied to each of the plurality of third tanks and by the amount of nutrient content to be supplied to each third tank being independently controlled.

6. A method for producing a fertilizer for plants using the production system according to claim 1, the method comprising:
separating impurities from water discharged from the aquaculture water tank; and
generating nutrient content from the separated impurities, and in a case where the amount of the generated nutrient content is excessive, storing the excessive nutrient content in the liquid fertilizer storage tank that stores the nutrient content.

7. The production system according to claim 1, further comprising:

a pH adjustment unit configured to adjust pH of at least one of water in the at least one aquaculture water tank and water in the at least one hydroponic culture water tank.

8. The production system according to claim 1, wherein the water treatment device performs water treatment on water which flows to the at least one aquaculture water tank or the at least one hydroponic culture water tank.

9. The production system according to claim 8, wherein the water treatment device performs at least one of desalination treatment, sterilization treatment, pH adjustment treatment, dissolved oxygen concentration adjustment treatment, and dissolved carbon dioxide concentration adjustment treatment.

10. The production system according to claim 1, wherein the water treatment device generates the liquid fertilizer with one or more aerobes.

11. The production system according to claim 1, wherein the water treatment device includes a filter or a membrane that separates the impurities and the solid-liquid separation liquid from the water discharged from the at least one aquaculture water tank as the solid-liquid separation unit.

12. A non-transitory computer-readable storage medium storing therein a program that causes a water treatment device configured to treat water discharged from an aquaculture water tank for culturing water creatures and supply the treated water to a hydroponic culture water tank for hydroponically growing plants within a production system, the production system comprising:

the water treatment device configured to treat the water discharged from the aquaculture water tank and supply the treated water to the hydroponic culture water tank, the water treatment device including:

a solid-liquid separation unit that separates impurities and solid-liquid separation liquid from the water discharged from the aquaculture water tank, thereby generating treated water that is supplied to the hydroponic culture water tank and the separated impurities used to generate a liquid fertilizer;

a liquid fertilizer storage tank that stores the liquid fertilizer generated from the impurities supplied by the solid-liquid separation unit, the liquid fertilizer storage tank configured to supply the liquid fertilizer to the hydroponic culture water tank;

a first pipe configured to supply the treated water from the water treatment device to the hydroponic culture water tank;

a first tank;

a second tank; and a second pipe configured to supply the treated water from the water treatment device to the first tank and the second tank; wherein the first tank stores water discharged from the hydroponic culture water tank and the treated water from the water treatment device supplies the water discharged from the hydroponic culture water tank and the treated water from the water treatment device to at least one of the hydroponic culture water tank and the second tank, wherein the first tank supplies the water discharged from the hydroponic culture tank and the treated water from the water treatment device directly to the at least one hydroponic culture water tank, and the second tank stores the water discharged from the first tank and treated water discharged from the water treatment device via the second pipe and supplies the water discharged from the first tank and treated water discharged from the water treatment device to the aquaculture water tank, to execute a process comprising:

controlling the amount of nutrient content for the plants to be supplied to the hydroponic culture water tank by generating the nutrient content from impurities contained in the water discharged from the aquaculture water tank, and in a case where the amount of the generated nutrient content is excessive, storing the excessive nutrient content in the liquid fertilizer storage tank.

13. A method for controlling a production system comprising:

an aquaculture water tank configured to culture water creatures;

a hydroponic culture water tank configured to hydroponically grow plants;

a water treatment device configured to treat water discharged from the aquaculture water tank and supply the treated water to the hydroponic culture water tank, the water treatment device including:

a solid-liquid separation unit that separates impurities and solid-liquid separation liquid from the water discharged from the aquaculture water tank, thereby generating treated water that is supplied to the hydroponic culture water tank and the separated impurities used to generate a liquid fertilizer;

a liquid fertilizer storage tank that stores the liquid fertilizer generated from the separated impurities supplied by the solid-liquid separation unit, the liquid fertilizer storage tank configured to supply the liquid fertilizer to the hydroponic culture water tank;

a first pipe configured to supply the treated water from the water treatment device to the hydroponic culture water tank;

a first tank;

a second tank; and a second pipe configured to supply the treated water from the water treatment device to the first tank and the second tank; wherein the first tank stores water discharged from the hydroponic culture water tank and the treated water from the water treatment device and supplies the water discharged from the hydroponic culture water tank to the hydroponic culture water tank and the second tank, wherein the first tank supplies the water discharged from the at least one hydroponic culture water tank and the treated water from the water treatment device directly to the at least one hydroponic culture water tank, and the second tank stores the water discharged from the first tank and treated water discharged from the water treatment device via the second pipe and supplies the water discharged from the first tank and treated water discharged from the water treatment device to the aquaculture water tank, the method comprising:

treating water discharged from the aquaculture water tank and supplying the treated water to the hydroponic culture water tank; and controlling the amount of the nutrient content for the plants to be supplied to the hydroponic culture water tank by generating the nutrient content from impurities contained in the water discharged from the aquaculture water tank, and in a case where the amount of the generated nutrient content is excessive, storing the excessive nutrient content in the liquid fertilizer storage tank.

* * * * *